(12) United States Patent
Himmelsbach et al.

(10) Patent No.: US 10,144,610 B2
(45) Date of Patent: Dec. 4, 2018

(54) DISPENSER

(71) Applicant: tesa SE, Norderstedt (DE)

(72) Inventors: Peter Himmelsbach, Buxtehude (DE); Hans-Peter Brandt, Schenefeld (DE)

(73) Assignee: TESA SE, Norderstedt (DE)

( * ) Notice: Subject to any disclaimer, the term of this patent is extended or adjusted under 35 U.S.C. 154(b) by 120 days.

(21) Appl. No.: 14/911,482

(22) PCT Filed: Jul. 23, 2014

(86) PCT No.: PCT/EP2014/065783
§ 371 (c)(1),
(2) Date: Feb. 11, 2016

(87) PCT Pub. No.: WO2015/022155
PCT Pub. Date: Feb. 19, 2015

(65) Prior Publication Data
US 2016/0251191 A1 Sep. 1, 2016

(30) Foreign Application Priority Data

Aug. 15, 2013 (DE) .......................... 10 2013 216 253

(51) Int. Cl.
*B65H 37/00* (2006.01)
*B65H 35/04* (2006.01)
(Continued)

(52) U.S. Cl.
CPC .......... *B65H 37/002* (2013.01); *B65C 9/0006* (2013.01); *C09J 7/403* (2018.01);
(Continued)

(58) Field of Classification Search
CPC ...... B65H 37/002; B65H 35/04; B65H 35/10; C09J 7/403; G09F 3/0286;
(Continued)

(56) References Cited

U.S. PATENT DOCUMENTS 2,331,019 A * 10/1943 Flood ...................... B65C 11/00
156/DIG. 48
2,765,205 A * 10/1956 Capella ................... B65C 11/00
156/DIG. 33
(Continued)

FOREIGN PATENT DOCUMENTS

EP 0266757 A1 5/1988
JP H-0872838 A 2/1996
(Continued)

OTHER PUBLICATIONS

Kobayashi, "JP2011213458 A, machine translation", published Oct. 27, 2011.*
(Continued)

*Primary Examiner* — Alexa B Efta
(74) *Attorney, Agent, or Firm* — Norris McLaughlin P.A.

(57) ABSTRACT

A dispenser dispenses a material that is adhesive on at least one side, wherein at least one adhesive side of the material is covered with a liner, which has at least one slit running in a longitudinal direction, with the material placed on the liner being wound into a roll in the form of an Archimedean spiral and at least one slit being located beneath the material covered with the liner. The dispenser comprises a (i) frame, one end of which has a receptacle for the material, so that the material roll is rotatably mounted, (ii) a first guiding device, by means of which the material is guided together with the liner to a first dispensing edge, at which at least a first liner strip is pulled off, with the liner being separated at the slit located under the material, while the material with the remaining second liner strip is guided to a second dispensing edge, and (iii) a second guiding device, by means of which the material, together with the remaining liner strips, is guided to a second dispensing edge, at which the remaining second liner strip can be pulled off.

13 Claims, 2 Drawing Sheets

Figure 1:
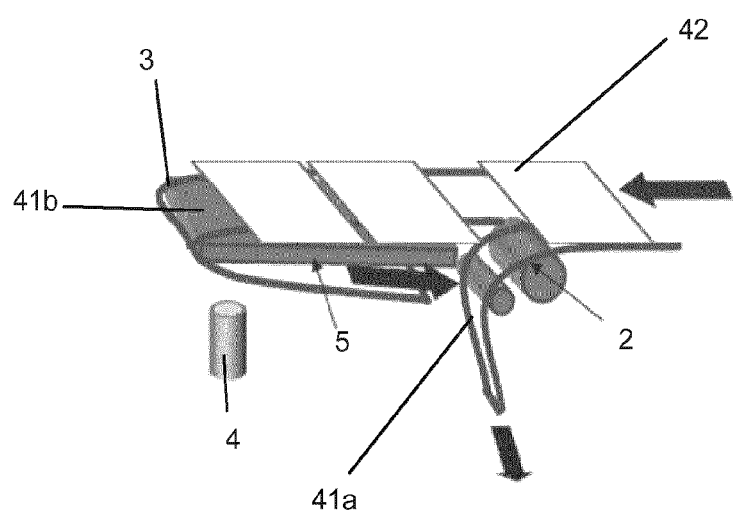

(51) Int. Cl.
*B65H 35/10* (2006.01)
*B65C 9/00* (2006.01)
*B65C 11/00* (2006.01)
*G09F 3/00* (2006.01)
*C09J 7/40* (2018.01)
*G09F 3/02* (2006.01)

(52) U.S. Cl.
CPC .......... *G09F 3/0286* (2013.01); *B65C 11/006* (2013.01); *B65C 2009/0009* (2013.01); *B65C 2009/0087* (2013.01); *B65C 2210/0078* (2013.01); *B65H 35/04* (2013.01); *B65H 35/10* (2013.01); *B65H 2701/194* (2013.01); *C09J 2400/22* (2013.01); *G09F 2003/0229* (2013.01)

(58) Field of Classification Search
CPC .......... G09F 2003/0229; B65C 9/0006; B65C 2009/0009; B65C 11/004; B65C 2210/0078
See application file for complete search history.

(56) References Cited

U.S. PATENT DOCUMENTS

| | | | | |
|---|---|---|---|---|
| 3,006,502 A | * | 10/1961 | Tobey | B65C 11/00 221/73 |
| 3,551,262 A | * | 12/1970 | Kelly | B65C 9/1869 156/541 |
| 4,061,808 A | * | 12/1977 | Sato | B65C 9/1865 156/250 |
| 4,089,730 A | * | 5/1978 | Mahn | B65C 1/025 156/541 |
| 4,648,930 A | | 3/1987 | La Mers | |
| 5,658,648 A | * | 8/1997 | Doerr | B32B 27/00 428/195.1 |
| 2002/0045019 A1 | * | 4/2002 | Gassner | B65H 19/102 428/41.8 |
| 2004/0014390 A1 | * | 1/2004 | Lodde | D04H 1/435 442/415 |
| 2010/0129583 A1 | * | 5/2010 | Hong | G09F 3/0288 428/41.8 |
| 2011/0189422 A1 | * | 8/2011 | Frances | B29C 59/14 428/41.5 |

FOREIGN PATENT DOCUMENTS

| | | | |
|---|---|---|---|
| JP | 08072838 A | * | 3/1996 |
| JP | 2009157030 A | * | 7/2009 |
| JP | 2011-213458 A | | 10/2011 |
| JP | 2011213458 A | * | 10/2011 |

OTHER PUBLICATIONS

English-language translation of International Search Report for Application No. PCT/EP2014/065783 dated Oct. 10, 2014.
Satas, Donatas, "Handbook of Pressure Sensitive Adhesive Technology", 1999, pp. 1-857, Third Edition, Satas & Associates, Warwick, Rhode Island.

* cited by examiner

DISPENSER

This application is a 371 application of PCT/EP2014/065783 filed Jul. 23, 2014, which claims foreign priority benefit under 35 U.S.C. § 119 of German Application No. DE 10 2013 216 253.7 filed Aug. 15, 2013.

The present invention concerns a dispenser for dispensing a material that is adhesive on at least one side, in which at least one adhesive side of the material is covered with a liner.

At the end of the manufacturing process, adhesive tapes that are coated with adhesives on one or both sides are usually wound into a roll on a core (of plastic or cardboard) in the form of an Archimedean spiral. In the case of tapes adhering on one or both sides, in order to prevent adhesion of the pressure-sensitive adhesive compound to the carrier, the adhesive tapes are covered prior to winding with an anti-adhesive covering material (also referred to as a separating material) that is wound up together with the adhesive tape. Such covering materials are known to the person having ordinary skill in the art as release liners or liners.

A liner (release paper, release film) is not a component of an adhesive tape, but merely an auxiliary means used in the manufacturing, storage, or further processing thereof by punching. Moreover, in contrast to an adhesive tape backing, a liner is not fasted to an adhesive layer, at least over part of its length.

Before using the adhesive tape, the liner is ordinarily removed.

Self-adhesive labels, also referred to as blanks, are manufactured in roll form by coating the label material with an adhesive compound and then covering it with a liner. In an alternative method, the covering material can also be coated, after which the backing material is laminated onto it. An application-oriented composite is then produced by means of suitable process steps. The label material is rolled into large rolls (referred to as master rolls).

The master rolls are then unrolled, and the labels are punched from the label material, i.e., the uppermost layers of the material composite of the adhesive label material and the liner are cut with or without a grid according to the subsequent shape of the label. Of course, direct separation without intermediate rolling up is also possible.

In the following step, the so-called grid can optionally be pulled off and rolled up. This is the excess material around the label.

In the last step, the punched labels, often in the form of several webs adjacent to one another, are rolled back into large rolls.

The master roll from which the blanks are punched ordinarily has a high width, so that several webs are arranged adjacent to one another in a longitudinal direction. For further processing, the master roll is therefore cut in a longitudinal direction, usually into single-web label rolls, wherein the width of the strip being produced is adapted to the width of the blanks, so that a web of blanks arranged successively, i.e. in a longitudinal direction, is present on the strip being produced.

If desired, two or more blanks may also be arranged adjacent to one another on the strip being produced.

Finally, the webs are wound in the form of an Archimedean spiral with specified diameters or numbers of labels onto a core (of plastic or cardboard).

In this case as well, the individual rolls may be cut from the master roll without intermediate rolling up.

The problem with such blank or label rolls is that the entire surface of the blanks is located on the liner strip. Depending on the material making up the backing and/or the adhesive compound of the blanks, and/or the material making up the liner, the blanks can only be separated from the liner with great difficulty for the important dispensing process. The blanks adhere firmly to the liner.

Adhesive tapes of this type are commonly used in industrial production. They can be used for fastening or sealing. In some cases, they can have a damping effect. A particularly preferred field of application is the automobile industry. In this case, for example, cables are fastened in place using adhesive tape.

For this reason, handling of the blanks always poses a major problem. The liner is ordinarily sealed flush with the blanks, i.e., there is no remaining piece of the blank by which it can be easily grasped and pulled off. On the contrary, because the liner and blanks are congruent, it is often very difficult and thus very time-consuming to release the blank at least one point on the liner strip. This is no longer acceptable at current production rates.

The supplier of such blanks is expected to provide a solution so that the blanks located on the liner can be removed easily and quickly.

This is problematic in cases where the bending stiffness of the backing material is low and the peeling strength of the liner—because of the adhesive compound selected and/or the amount thereof applied—is high. In such cases, conventional dispensing devices cannot operate reliably, because the blank wraps around the provided dispensing edge and does not separate from the liner. This results in breakdowns.

The object of the invention is to provide a dispenser whose structural design makes it possible in particular to simply and quickly dispense single-sided adhesive tape sections or punchings located on a liner onto any desired substrate, and to simply remove the adhesive tape or blank.

This object is achieved by means of a dispenser, as disclosed in the main claim. Improvements of the device according to the invention are the subject matter of the subclaims.

Accordingly, the invention describes a dispenser for dispensing a material that is adhesive on at least one side, wherein at least one adhesive side of the material is covered with a liner, which has at least one slit running in a longitudinal direction, with the material placed on the liner being wound onto a roll in the form of an Archimedean spiral and at least one slit being located beneath the material covered with the liner.

The dispenser consists of a frame, one end of which has a receptacle for the material roll, so that the material roll is rotatably mounted, a first guiding device by means of which the material is guided together with the liner to a first dispensing edge, at which at least one first, preferably smaller liner strip is pulled off, in that the liner is cut open at the slit located beneath the material, while the material with the remaining second, preferably larger liner strip, by means of a second guiding device to a second dispensing edge. At this point, the blank is only partially covered by the liner, and can therefore easily be removed (preferably to the side). The remaining liner strip is preferably rolled up by means of a further device.

The material should preferably be an at least single-sided adhesive tape or a series of at least single-sided adhesive blanks arranged successively.

The individual blanks (adhesive tape sections) are preferably arranged on the liner in the form of rectangles. It is also highly advantageous if these rectangles are arranged on the liner with no intervals between them.

In the following, preferred embodiments of the dispenser will be described based on a material consisting of a row of successively arranged, at least single-sided adhesive blanks, without this being construed to constitute any limitation whatsoever.

Removal of the one liner strip at the first dispensing edge causes a section of each blank to be uncovered, and thus released from the liner, so that this section can serve as a tab that can easily be grasped by anyone.

The use of a slit liner allows the material dispensed in the dispenser according to the invention to be available with the tabs released from the liner. By means of this dispenser configuration, the forced guidance with partial coverage of the liner makes it possible to dispense extremely soft and strongly adhesive blanks.

Preferably, blanks are dispensed having a peeling strength of less than 100 cN/cm, more preferably a peeling strength of 2 cN/cm to 50 cN/cm, and most preferably a peeling strength of 4 cN/cm to 21 cN/cm.

In order to determine peeling strength, the samples are conditioned for 24 hours at 23° C. and 50% relative humidity. The blank of the adhesive tape covered with a release paper is then cut into a 20 mm wide strip. The blank is glued to a test plate using a double-sided adhesive tape, so that the backing of the blank is fixed in place with the double-sided adhesive tape. The test plate is fixed in place in a clamping device of a tensile testing machine, and the release paper is pulled off at a 180° angle, with the force required for this being taken up by a load cell. The release paper is pulled off at a rate of 300 mm/min.

It is also preferable for the dispensed blanks to have a bending stiffness of less than 0.5 mNm, more preferably a bending stiffness of less than 0.25 mNm, and most preferably a bending stiffness of less than 0.05 mNm.

In order to determine bending stiffness according to DIN 53864, a 38 mm-wide strip of the sample to be tested is clamped between two clamping jaws of the measuring device (manufactured by Lorentzen & Wettre). The sample is rotated at a constant rate against a force sensor, with the force being taken up depending on the respective bending angle. The values for bending stiffness are determined at a bending angle of 15°.

Preferably, the liner has only one slit.

The width ratio of the two liner strips being produced should preferably be between 10:90 and 30:70, particularly preferably between 20:80 and 30:70, and most preferably exactly 20:80, with the first liner strip also preferably being the narrower.

According to a preferred embodiment, the slit only cuts completely through the liner, i.e., the remaining blank is not slit at this location.

The slit (or, if several are present, the slits) may be configured as a continuous or broken line, the latter preferably broken at regular intervals.

In another embodiment of the invention, a part of the slit liner is removed during the production process and a new liner is added. In this case, the newly added liner may have a width different from the removed liner. Preferably, the width of the newly added liner should be greater than the width of the removed liner.

Moreover, slitting of the liner may also take place in the device according to the invention.

Slitting of the liner may be carried out using any conventional cutting, slitting, or punching methods that provide the precision required for cutting and are suitable for use with such small intervals. Particularly suitable for this use is the method of rotary punching with suitable tools.

According to a preferred embodiment of the invention, the first liner strip is first pulled off over the dispensing edge, preferably using an electrically or pneumatically driven roller, and then removed, and optionally wound up, preferably on the same or another roller.

It is also preferred for the receptacle of the material roll to be braked, so that uncontrolled running of the material roll, for example when forward feed of the liner is stopped, is prevented.

Moreover, at least one adjustable brake, particularly a friction brake, provides uniform and sufficient tension in the material web covered with the liner during the dispensing process.

The brake preferably used in the material roll unwinding process provides the necessary pre-tensioning of the liner strip at the site where the blank can be removed.

According to another preferred embodiment of the invention, the second liner strip is guided to a removal plate, preferably using an electrically or pneumatically driven roller. It is there that the adhesive tape blanks are removed and the remaining liner is fed off, and optionally also wound onto a roller.

Winding up of the two liners should preferably take place at different rates, with one liner being wound somewhat more quickly and synchronized with the main drive of the other liner by means of slippage. This ensures even operation.

In cases where the liner is slit at multiple sites and is pulled off in multiple strips, each individual strip should preferably be pulled off and wound up, preferably using an electrically or pneumatically driven roller.

Particularly in cases where the blanks are arranged in several webs on the liner (i.e., when two or more blanks are adjacent to one another in a longitudinal direction), at least one slit should preferably be provided beneath each web of the blanks.

It is also preferred for the dispenser to have a sensor in the area of the second dispensing edge or the removal plate that is used to detect that a punched part has reached the end of the adhesive tape in the vicinity of the dispensing edge.

In this case, for example, the forward feed of the liner rollers is stopped.

Two or more sensors may also be used. The sensors can send signals to the device electromechanically (for example, using a rocker switch), electrooptically, or by acoustic sensor technology.

After removal of a blank, the material is transported further, for example by pulling on both liners on the drive side (electrically or pneumatically driven winding up of the liners).

In a particularly advantageous embodiment, the dispenser dispenses a material comprising a row of single-sided adhesive blanks arranged successively on a liner that has a slit, with the width ratio of the two liner strips produced preferably being 20:80.

In an advantageous embodiment, the adhesive tape blanks are 10 to 250 mm in width and have a length of 10 mm to 250 mm. Particularly preferred are adhesive tape blanks with a width of 30 mm to 200 mm and a length of 10 to 100 mm. Most particularly preferred are adhesive tape blanks with a width of 30 to 120 mm and a length of 30 to 100 mm. In an advantageous embodiment, the narrower liner strip separated by the slit measures 2 mm, particularly preferably 2 to 50 mm, and most particularly 10 to 30 mm.

The general term "adhesive tape" within the meaning of the invention includes all self-adhesive laminar structures such as films or film sections extended in two dimensions, bands of extended length and limited width, band sections, and the like. Blanks or labels in the broadest sense are also subsumed under the term adhesive tape.

The adhesive tape can be provided in fixed lengths, such as e.g. piece goods or endless products, on rolls (Archimedean spirals) or spools. If blanks are used, these may have varying geometric shapes. For example—but without limiting the scope of the invention—quasi-rectangular or hexagonal and/or circular or oval laminar structures can be mentioned.

Paper, a paper-polyolefin composite, and/or a film should preferably be used as a backing for the adhesive tape and/or the liner.

In principle, films such as BOPP or MOPP, PET, PVC or non-wovens (cellulose or polymer-based), particularly PUR, can also be used as backings or liners. Moreover, foams (for example PUR, PE, PE/EVA, EPDM, PP, PE, silicone, etc.) are also suitable.

Examples of suitable film materials include PP, PE, PET, PA, PU, PVC, and polyester. In general, polyolefins, copolymers of ethylene and polar monomers such styrene, vinyl acetate, methyl methacrylate, butyl acrylate or acrylic acid, homopolymers such as HDPE, LDPE, MDPE, or copolymers of ethylene and another olefin such as propene, butene, hexene, or octene (for example LLDPE, VLLDE) or polypropylenes such as polypropylene homopolymers, polypropylene random copolymers or polypropylene block copolymers, and mixtures of all of these polymers may be used.

In order to impart an anti-adhesive action to the liners, they may be coated on one or both sides with an anti-adhesive coating.

A solvent-free coated silicone is preferably used as an anti-adhesive coating.

The anti-adhesive coating and/or solvent-free coated silicone should preferably be coated with 0.8 to 3.7 $g/m^2$, preferably 1.3 to 3.2 $g/m^2$, and most preferably 1.8 to 2.8 $g/m^2$.

However, solvent-containing systems are also suitable for use as anti-adhesive coatings, preferably with a coating amount of 0.3 to 1 $g/m^2$.

Moreover, examples of suitable materials for the anti-adhesive layers include silicone, paraffin, Teflon, or waxes. Silicone-free release layers such as "non Silicone" from Rexam or low-silicone content release layers such as "Lo ex" from Rexam may also be used.

The thickness of the liner should preferably be in the range of 20 to 120 µm, preferably 30 to 100 µm, and particularly preferably 50 to 80 µm. Even more preferably, it should be in the range of 45 to 55 or 60 to 80 µm.

Any pressure-sensitive adhesive compounds, such as those mentioned for example in SATAS, Handbook of Pressure-Sensitive Adhesive Technology, Third Edition, may be used as adhesive compounds for the adhesive tapes. Particularly suitable are natural/synthetic rubbers and acrylate-based adhesive compounds applied from the melt or solution.

Figure 2:
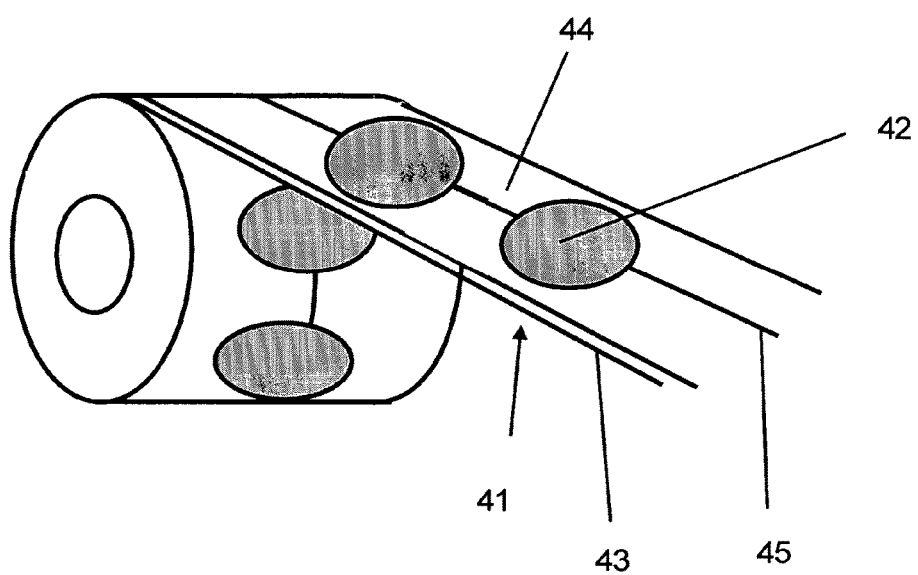

Particularly advantageous embodiments of the device are explained with reference to the figures described below, without this being intended to unnecessarily limit the scope of the invention. The figures show the following:

FIG. 1: a part of the dispenser and
FIG. 2: a roll of the backing material web with adhesive tape sections.

FIG. 1 shows a part of the dispenser for dispensing a material that is adhesive on at least one side 42, wherein at least one adhesive side of the material is covered with a liner 41, which has at least one slit running in a longitudinal direction 45.

The liner 41 is guided in the direction of a first dispensing edge 2 by a take-up roller, which is not shown, for the liner 41 equipped with blanks 42.

At this dispensing edge 2, the liner 41 is cut open at the slit 45 beneath the blanks 42, so that a first liner strip 41a is pulled off, and this strip is then wound up.

The blanks 42 with the remaining second liner strip 41b are guided to a second dispensing edge 3, at which the remaining second liner strip 41b is pulled off to the side.

In the area of the second dispensing edge 3, the dispenser has a sensor 4 used to detect when a blank 42 has reached the vicinity of the dispensing edge 3 and is thus in the dispensing area 5.

According to FIG. 2, the liner 41 is wound into a roll in the form of an Archimedean spiral. The individual blanks 42, here in the form of circles, are arranged at regular intervals on the liner 41.

The liner 41 has various anti-adhesive coatings 43, 44. The anti-adhesive coating 43 located on the lower side of the liner 41 is more repellent than the anti-adhesive coating 44 located on the upper side of the liner 1.

Finally, the liner 41 has a slit 45 that is centrally arranged so that the slit 45 is under the blanks 42.

The invention claimed is:

1. A dispenser adapted for dispensing a material that is adhesive on at least one side, wherein at least one adhesive side of the material is covered with a liner, the liner having at least one slit running in a longitudinal direction to provide a first liner strip and at least one second liner strip, with the material placed on the liner being wound into a material roll in the form of an Archimedean spiral and the at least one slit being located beneath the material covered with the liner, the dispenser comprising:

a frame, wherein one end of the frame has a receptacle for the material, so that the material roll is rotatably mounted;

a first guiding device, by means of which the material is guided together with the liner to a first dispensing edge, at which at least the first liner strip is pulled off, with the liner being separated at the slit located under the material, while the material with the at least one second liner strip remaining thereon is guided to a second dispensing edge;

an electrically or pneumatically driven roller configured to pull the first liner strip off the material over the first dispensing edge and then to wind the pulled-off first liner strip onto the electrically or pneumatically driven roller, and a second guiding device comprising a removal plate that is a flat sheet or strip of plate material having a top surface, an opposite bottom surface and a total length defined between a first end and a second end, wherein the second end of the flat sheet or strip is adjacent to the first guiding device such that the second end of the flat sheet or strip is provided between the first guiding device and the first end of the flat sheet or strip, wherein the second guiding device is configured such that the material, together with the at least one second liner strip remaining thereon, is guided to the second dispensing edge, provided at the first end of the flat sheet or strip of the removal, at which the at least one second liner strip remaining thereon is removable therefrom the material.

2. The dispenser according to claim 1, wherein the material is a series of at least single-sided adhesive blanks arranged successively.

3. The dispenser according to claim 1, wherein the liner has only one slit.

4. The dispenser according to claim 3, wherein the width ratio of the two liner strips being produced is between 20:80 and 30:70.

5. The dispenser according to claim 4, wherein the width ratio of the two liner strips being produced is exactly 20:80.

6. The dispenser according to claim 3, wherein a total width of the first liner strip is narrower than a total width of the second liner strip and a width ratio of the first liner strip to the second liner strip is between 10:90 and 30:70.

7. The dispenser according to claim 1, wherein an uptake of the material roll is braked.

8. The dispenser according to claim 1, wherein the at least one second liner strip is first pulled over the first or second dispensing edge, using an electrically or pneumatically driven roller.

9. The dispenser according to claim 1, wherein the material is transferred further by pulling on both the first liner strip and the at least one second liner strip on a drive side.

10. The dispenser according to claim 1, wherein the material has a width of 10 to 300 mm and a length of 10 to 320 mm, with the liner having a slit measuring 2 to 40 mm.

11. The dispenser according to claim 1, wherein the material has a liner peeling strength of 2 to 50 cN/cm and a bending stiffness of less than 0.5 mNm.

12. A method for dispensing the material according to claim 1, the method comprising:
dispensing material from the dispenser according to claim 1 to provide dispensed material;
manufacturing an industrial component comprising the dispensed material.

13. The method according to claim 12, wherein the industrial component is an automotive component or a cable fastening component.

* * * * *